(12) United States Patent
Yokoyama

(10) Patent No.: US 8,031,352 B2
(45) Date of Patent: Oct. 4, 2011

(54) APPARATUS AND METHOD FOR PROCESSING RECEIVED DATA

(75) Inventor: Tetsuya Yokoyama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1292 days.

(21) Appl. No.: 10/329,376

(22) Filed: Dec. 27, 2002

(65) Prior Publication Data

US 2003/0145238 A1 Jul. 31, 2003

(30) Foreign Application Priority Data

Jan. 28, 2002 (JP) .................................. 2002-018637

(51) Int. Cl.
*G06F 15/00* (2006.01)
(52) U.S. Cl. ............. 358/1.15; 358/1.16; 358/1.17; 358/1.18; 358/403; 709/219; 348/231.3; 715/255
(58) Field of Classification Search ............... 358/1.15, 358/1.16, 1.17, 1.18; 709/219; 348/231.3; 715/255
See application file for complete search history.

(56) References Cited

U.S. PATENT DOCUMENTS

| | | | | |
|---|---|---|---|---|
| 5,237,430 A | * | 8/1993 | Sakurai | 358/444 |
| 5,666,210 A | * | 9/1997 | Yanai et al. | 358/402 |
| 5,717,506 A | * | 2/1998 | Yamamoto et al. | 358/523 |
| 5,963,340 A | * | 10/1999 | Kim | 358/440 |
| 6,327,046 B1 | * | 12/2001 | Miyamoto et al. | 358/1.15 |
| 6,330,070 B1 | * | 12/2001 | Toyoda et al. | 358/1.15 |
| 6,704,775 B1 | * | 3/2004 | Sato et al. | 709/219 |
| 6,885,481 B1 | * | 4/2005 | Dawe | 358/505 |
| 7,020,650 B2 | * | 3/2006 | Sato et al. | 1/1 |
| 2002/0015178 A1 | * | 2/2002 | Tamaru | 358/1.15 |
| 2002/0143804 A1 | * | 10/2002 | Dowdy | 707/500 |
| 2006/0274164 A1 | * | 12/2006 | Kimura et al. | 348/231.3 |

FOREIGN PATENT DOCUMENTS

| | | |
|---|---|---|
| JP | 06-225060 | 8/1994 |
| JP | 06-266636 | 9/1994 |
| JP | 11-007406 | 12/1999 |
| JP | 2001-186320 | 7/2001 |

* cited by examiner

*Primary Examiner* — David K Moore
*Assistant Examiner* — Mark Milia
(74) *Attorney, Agent, or Firm* — Fitzpatrick, Cella, Harper & Scinto

(57) ABSTRACT

In an apparatus capable of handing data received by a communication function, such as facsimile function or the like, information for generating a file name to be set for received data is registered so as to correspond to receiving conditions (for example, in facsimile reception, a sender's telephone number, an F code, a password and the like). When data has been received, receiving conditions are determined, and a file name based on the information registered for the data is set in accordance with the result of the determination. Thus, the receiving side can easily discriminate the contents of the data.

26 Claims, 3 Drawing Sheets

FIG.4

| | |
|---|---|
| CONDITION NAME : | RECEPTION FROM 01-123-4444 |

CONDITIONS :

| | |
|---|---|
| RECEIVING MEANS | FAX ▼ |
| COMMUNICATION PARTNER'S TELEPHONE NUMBER | 01-123-4444 |
| F CODE | 0001 |
| PASSWORD | * * * * |
| PROCESSING : | STORAGE IN DATABASE |
| DOCUMENT NAME : | FAX RECEPTION 01 |

SETTING     CANCEL

APPARATUS AND METHOD FOR PROCESSING RECEIVED DATA

BACKGROUND OF THE INVENTION

1. Field of the Invention

The present invention relates to an apparatus and method for processing received data, and more particularly, to an apparatus and method for setting an appropriate file name to received data.

2. Description of the Related Art

An approach of processing received data has been known in which a file name of the data is determined, for example, from a time of reception of the data by an apparatus. Another approach has also been known in which character recognition of the contents of received data is performed, and a file name is determined from the contents.

However, when determining the file name of received data, for example, from the time of reception of the data at the apparatus that has received the data, the file name has no relationship with the contents of the received data. Accordingly, it is necessary to open the received data using application software or the like, and confirm the contents of the data by displaying the data, resulting in consumption of a considerable amount of time and procedure.

When performing character recognition using an image of received data, and determining a file name from the contents of the data, there is the possibility of performing erroneous character recognition, sometimes resulting in provision of an inadequate document name. As a result, the user may be confused. Furthermore, since character recognition requires complicated processing, the load of the apparatus increases.

SUMMARY OF THE INVENTION

It is an object of the present invention to provide an apparatus and method in which the above-described problems are solved.

It is another object of the present invention to provide an apparatus and method in which an appropriate file name can be set to received data.

It is still another object of the present invention to provide an apparatus and method in which file-name information is registered for every condition when receiving data. Conditions when data has been received are determined, and a file name is set for the received data in accordance with the result of the determination.

According to one aspect of the present invention, a data communication apparatus includes a receiver, arranged to receive data, a register, arranged to register file-name information for the data received by the receiver, so as to correspond to a condition when the data is received by the receiver, a determiner, arranged to determine the condition when the data is received by the receiver, when the data has been received by the receiver, and a setter, arranged to set a file name based on the file-name information registered by the register for the data received by the receiver in accordance with a determination by the determiner.

According to another aspect of the present invention, a data processing method includes a receiving step of receiving data, a registering step of registering file-name information for the data received in the receiving step, so as to correspond to a condition when the data is received in the receiving step, a determining step of determining the condition when the data is received in the receiving step, when the data has been received in the receiving step, and a setting step of setting a file name based on the file-name information registered in the registering step for the data received in the receiving step in accordance with a determination in the determining step.

According to still another aspect of the present invention, a computer readable program stored in a storage medium includes a receiving step of receiving data, a registering step of registering file-name information for the data received in the receiving step, so as to correspond to a condition when the data is received in the receiving step, a determining step of determining the condition when the data is received in the receiving step, when the data has been received in the receiving step, and a setting step of setting a file name based on the file-name information registered in the registering step for the data received in the receiving step in accordance with a determination in the determining step.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 4 is a diagram illustrating a dialog box for registering processing of a received document for each condition during reception, displayed on the composite apparatus shown in FIG. 1.

DESCRIPTION OF THE PREFERRED EMBODIMENTS

Preferred embodiments of the present invention will now be described with reference to the drawings.

Figure 1:
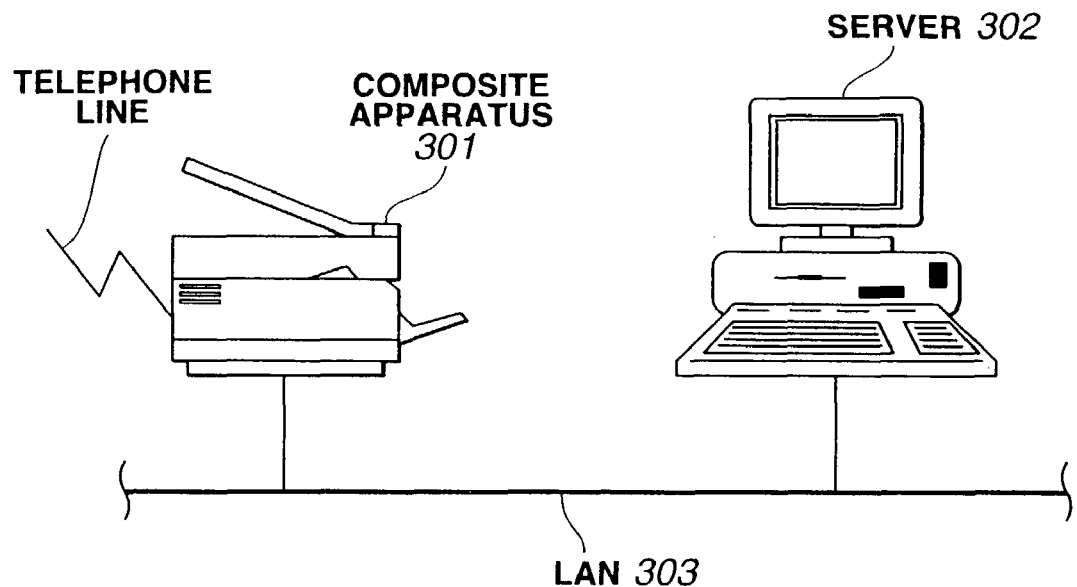
FIG. 1 is a diagram illustrating the configuration of a network system including a composite apparatus, serving as a received-document processing apparatus, according to an embodiment of the present invention.
Figure 2:
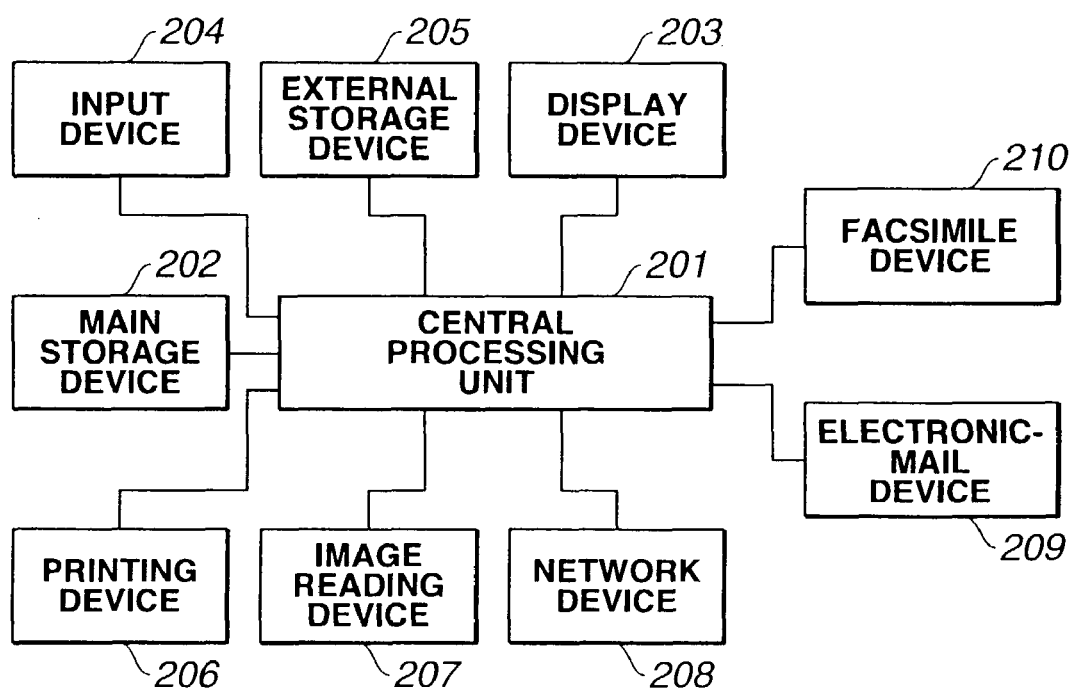
FIG. 2 is a block diagram illustrating the configuration of the composite apparatus shown in FIG. 1.

FIG. 1 is a diagram illustrating the configuration of a network system including a composite apparatus, serving as a received-document processing apparatus, according to an embodiment of the present invention. FIG. 2 is a block diagram illustrating the configuration of the composite apparatus shown in FIG. 1.

As shown in FIG. 1, in this network system, a composite apparatus 301 having a plurality of functions, i.e., a copying function, a printer function, a facsimile function, and an electronic-mail function, and a server 302 are connected to a LAN (local area network) 303.

As shown in FIG. 2, the composite apparatus 301 includes a central processing unit 201, a main storage device 202, a display device 203, an input device 204, an external storage device 205, a printing device 206, an image reading device 207, a network device 208, an electronic-mail device 209, and a facsimile device 210, and performs arithmetical calculation and logic calculation.

The main storage device 202 stores information (including programs) necessary for processing performed by the composite apparatus 301. This information is read whenever necessary. The display device 203 includes, for example, a CRT (cathode-ray tube), a liquid-crystal display panel or the like for displaying a result of processing, including figures, characters and the like. A touch panel is sometimes provided on the display device 203. The input device 204 is used for inputting various data to the central processing unit 201, and includes, for example, a keyboard, a mouse, a card reader, the touch panel and the like. The external storage device 205 comprises, for example, a magnetic storage device, a magnetooptical storage device or the like for storing various sets of information. The printing device 206 comprises, for example, a laser-beam printer, an ink-jet printer or the like for printing a result of processing, including figures, characters and the like, as a visual image. The image reading device 207 performs scanning on a paper original, and converts image information on the original into electronic information. The network device 208 connects the LAN 303 and the composite apparatus 301, and exchanges data according to TCP/IP (Transmission Control Protocol/Internet Protocol) or the like. The electronic-mail device 209 performs transmission/reception of electronic mail with an external apparatus via the LAN 303 according to known SMTP (Simple Mail Transfer Protocol) or POP (Post Office Protocol). The facsimile apparatus 210 performs facsimile transmission/reception with an external apparatus via a telephone line according to the known G3/G4 facsimile procedure.

The composite apparatus 301 has the function of processing a received document, in which, for example, when receiving a document according to facsimile reception, the received document is printed by the printing device 206 or transmitted (transferred) to the server 302 depending on conditions during document reception.

Figure 3:
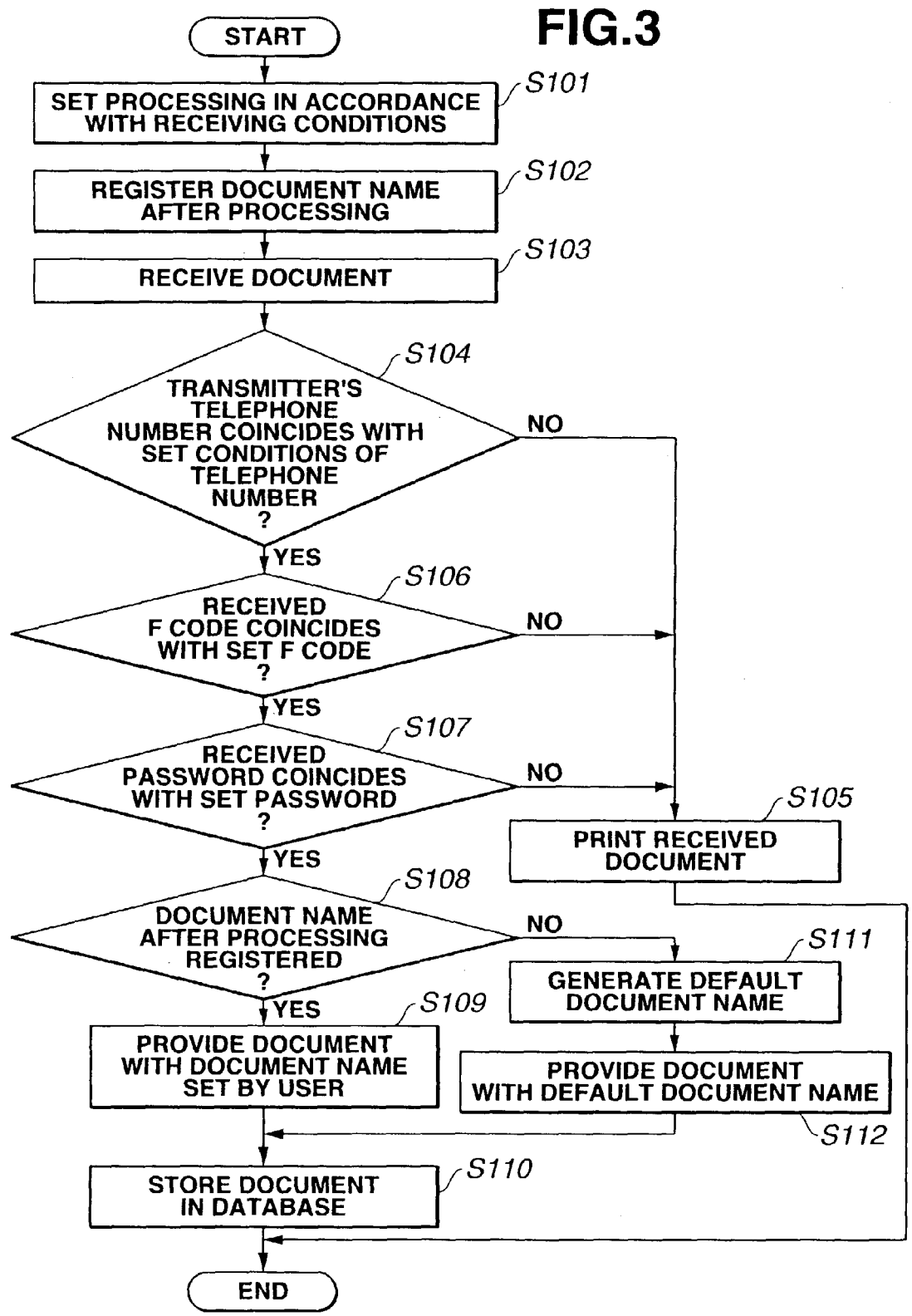
FIG. 3 is a flowchart illustrating a procedure of processing a received document by the composite apparatus shown in FIG. 1.

Next, processing for a received document to be performed by the composite apparatus 301 will be described in detail with reference to FIGS. 3 and 4. FIG. 3 is a flowchart illustrating a procedure of processing a received document by the composite apparatus 301. FIG. 4 is a diagram illustrating a dialog box for registering processing of a received document for respective conditions during reception. The procedure shown in FIG. 3 is executed by the central processing unit 201 in accordance with a program stored in the main storage device 202.

As shown in FIG. 3, in the composite apparatus 301, first, in step S101, a dialog box for registering processing conditions of a received document for respective conditions during reception, such as the dialog box shown in FIG. 4, is displayed on the display device 203. On this dialog box, setting so as to change processing of a document depending on conditions during document reception is performed by the user, and the setting is received. In this embodiment, as shown in FIG. 4, the sender's telephone number, an F code (sub-address) and a password (these are used in known facsimile communication) can be set as conditions for each reception operation by the facsimile device 210. When conditions of a received document coincide with these conditions, the received document is converted into a file having a predetermined format as processing of the document, and a document name corresponding to the registered conditions is set and is stored in a database in the server 302 via the LAN 330. When conditions of a received document do not coincide with these conditions, a document name is not set, and printing is performed by the printing device 206 as default processing.

The default processing is not limited to printing. Any other appropriate processing may, of course, also be performed. At that time, when the received document must be handled as a file, processing is performed after setting a common document name to be set to a document whose conditions do not coincide with the registered conditions, or a document name in accordance with a predetermined rule.

Conditions that can be registered for the sender's telephone number include "not taking into consideration", "equal to - - - ", "starting from - - - ", "starting after - - - ", "including - - - ", "not equal to - - - ", and "not including - - - ". Conditions for the F code or the password include "present", and "equal to - - - ".

Then, in step S102, a document name set by the user on the dialog box shown in FIG. 4 is registered as the document name. The set document name is used as the document name in the database. Then, when a document has been received via the facsimile device 210 in step S103, it is determined, in step S104, whether or not the telephone number of the sender of the received document coincides with the telephone number set in step S101 as one of the conditions. If the result of the determination in step S104 is negative, the process proceeds to step S105, where the received document is printed by the printing device 206 as default processing, and then the process is terminated.

If the result of the determination in step S104 is affirmative (when the set condition is "not taking into consideration", it is not determined that coincidence of the condition occur), the process proceeds to step S106, where it is determined whether or not the received F code coincides with the F code set in step S101 as one of the conditions during reception. If the result of the determination in step S106 is negative, the process proceeds to step S105, where the received document is printed by the printing device 207 as default processing, and then the process is terminated. When the result of the determination in step S106 is affirmative (irrespective of reception of the F code when setting relating to the F code is blank), the process proceeds to step S107, where it is determined whether or not the received password coincides with the password set in step S101 as one of the conditions during reception. If the result of the determination in step S107 is negative, the process proceeds to step S105, where the received document is printed by the printing device 207 as default processing, and then the process is terminated.

If the result of the determination in step S107 is affirmative, (irrespective of reception of the password when setting relating to the password is blank), the process proceeds to step S108, where it is determined whether or not a document name after processing has been registered by the user in the above-described step S102. If the result of the determination in step S108 is affirmative, the process proceeds to step S109, where the document name set by the user (the registered document name) is used as the document name of the received document. Then, in step S110, the received document is transferred to the server 302 via the LAN 303. Thus, in the server 302, the transferred received document is stored in the database with the registered document name. Then, the process is terminated.

If the result of the determination in step S108 is negative (the column of the document name in FIG. 4 is blank), the process proceeds to step S111, where a default document name is generated. In this embodiment, the default document name is generated from the date and the time of reception of the document. Then, in step S112, the default document name is used as the document name of the received document. Then, in step S110, the received document is transferred to the server 302 via the LAN 303. Thus, in the server 302, the transferred received document is stored in the database with the default document name. Then, the process is terminated.

As described above, in this embodiment, since the document name after receiving a document is set in accordance with the conditions during reception of the document, it is possible to provide the received document with a document name corresponding to the contents of the received document, and easily confirm a summary of the contents of the document from the document name without performing, for example, an operation of opening the document using application software in order to confirm the contents of the document.

That is, by setting a document name (file name) corresponding to a sender (determined by a telephone number in the above-described conditions) and a receiver (determined by an F code and a password in the above-described conditions), or arranging to cause a sender to transmit a document with conditions determined with the sender in advance (an F code and a password in the above-described conditions), it is possible to store a received document with a file name corresponding to a communication partner or the contents of the document, in a database as a file.

Furthermore, according to the above-described embodiment, it is unnecessary to perform character recognition for determining a document name for a received document, prevent confusion at the user due to erroneous recognition at character recognition, and perform processing for determining a document name with a simple approach.

In addition, when changing processing for a received document depending on conditions during reception, the user can easily understand in what conditions the document has been processed, and it is possible to improve operation efficiency.

In the above-described embodiment, a document name is set when coincidence of all conditions, i.e., the telephone number, the F code and the password, occurs. However, in the composite apparatus 301, a document name may also be registered such that the document name is set to a received document when coincidence of one or two of the conditions occurs. Moreover, conditions when receiving a document are not limited to the above-described ones, but various other appropriate conditions may also be adopted.

A received document is not always transferred to the server 302 and is stored in the database, but may, for example, be stored in the external storage device 205 within the composite apparatus 301. Alternatively, for example, electronic mail in which a received document is added as a file may be formed and transferred using the electronic-mail device 209, or transferred according to FTP (File Transfer Protocol) using the network device 208. Thus, the receiver of the transferred data can receive a document having a document name that allows to easily know the contents and the sender of the document.

It is also possible to designate a desired file format (TIFF, JPEG (Joint Photographic Experts Group), JBIG (Joint Bi-level Image Group), BMP (Basic Multilingual Plane), PICT, or the like) in accordance with conditions at reception. At that time, a different expander is, of course, set in accordance with the file format.

Although in the foregoing embodiment, a description has been provided of a document received by facsimile communication, a document name may, of course, also be registered for a document received via the electronic-mail device 209 or the network device 208 in accordance with conditions during reception, and processing corresponding to the received document may be performed.

Particularly, in the case of reception by means of electronic mail, "From" and "To" (when the composite apparatus 301 handles a plurality of mail accounts), "Subject", keywords included in the text of the received document, and the like may be adopted as conditions. As for methods of transfer of the received document, a method in which the text of the document is processed as a text file or a HTML (Hypertext Markup Language) file, a method in which only an added file is processed by neglecting the text (only the text is stored in the external storage device 205 within the composite apparatus 301), and the like may be set, and processing may be performed in accordance with the setting. Alternatively, for example, discrimination may be performed depending on by which of electronic mail and Internet facsimile a document has been received, by analyzing a header portion.

Such setting is performed using the registration picture frame shown in FIG. 4. When the item of receiving means is switched, conditions that can be set are displayed in accordance with the receiving means, and a registration operation can be performed in accordance with the conditions.

In the above-described embodiment, a document name is registered depending on conditions, and a document name is set to a received document whose conditions coincide with the registered conditions. However, instead of setting a registered document name as it is, a rule for setting a document name may be registered, and a document name may be set in accordance with the rule.

That is, when a plurality of documents whose conditions coincide with the same conditions are received, a numeral may be added to a designated document name, and the numeral may be successively increased, and when conditions of a document coincide with certain conditions, a document name based on the time of reception, or the like may be set.

The objects of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus. In such a case, the program codes themselves read from the storage medium realize the functions of the above-described embodiments, so that the storage medium storing the program codes constitutes the present invention. For example, a floppy disk, a hard disk, an optical disk, a magnetooptical disk, a CD (compact disc)-ROM (read-only memory), a CD-R (recordable), a CD-RW (rewritable), a magnetic tape, a nonvolatile memory card, a ROM or the like may be used as the storage medium for supplying the program codes. In some cases, program codes are supplied from a server computer via a communication network.

The present invention may also be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may also be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

The individual components shown in outline or designated by blocks in the drawings are all well known in the data processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modification and equivalent structures and functions.

What is claimed is:

1. A data communication apparatus comprising:
    a receiving unit configured to receive a document;
    a registering unit configured to register a plurality of data groups, each data group comprising a set of a character sequence, file-name information, and a document process to be performed to the received document, the character sequence and the file-name information being input and the document process being selected from a plurality of candidates by a user;
    a specifying unit configured to, if one of the plurality of character sequences registered by the registering unit as part of the data groups is included in the received document, specify the file-name information and the document process which are grouped with the included character sequence; and
    a processing unit configured to, without a user's operation, set a file name based on the specified file-name information to the received document and to perform the specified document process to the received document, and if none of the plurality of character sequences is included in the received document, to perform a predetermined process to the received document.

2. The data communication apparatus according to claim 1, wherein the processing unit transfers the received document to which the file name is set, to another data communication apparatus connected to the data communication apparatus via a network.

3. The data communication apparatus according to claim 1, wherein the registering unit further registers a character sequence so as not be related to file-name information, and wherein if the character sequence which is not related to file-name information is included in the received document, the processing unit sets a file name generated by a predetermined rule, to the received document.

4. The data communication apparatus according to claim 1, wherein the processing unit prints an image based on the received document, if none of the plurality of registered character sequences is included in the received document.

5. The data communication apparatus according to claim 1, wherein the registering unit registers a condition name for each of the groups.

6. The data communication apparatus according to claim 1, wherein the specifying unit specifies the file-name information and the document process if one of the plurality of registered character sequences is included in a character sequence acquired by analyzing a content of the received document.

7. The data communication apparatus according to claim 1, wherein the receiving unit receives an electronic-mail document via a network.

8. The data communication apparatus according to claim 7, wherein the specifying unit specifies the file-name information and the document process if one of the plurality of registered character sequences is included in any of a sender's address, a receiver's address, or a subject of the received electronic-mail document.

9. The data communication apparatus according to claim 1, wherein the receiving unit is capable of receiving the document according to a plurality of receiving protocols, and
    wherein the registering unit registers the plurality of data groups so as to be associated with any of the plurality of receiving protocols corresponding to the receiving unit.

10. The data communication apparatus according to claim 9, wherein the specifying unit specifies the file-name information and the document process if one of the character sequences registered to be associated with the receiving protocol used when the receiving unit has received the document, among the plurality of character sequences, is included in the received document.

11. The data communication apparatus according to claim 1, wherein the specifying unit species the file-name information and the document process, without a user's operation.

12. A data communication apparatus comprising:
    a receiving unit configured to receive a document and information associated with the document;
    a registering unit configured to register a plurality of data groups, each data group comprising a set of a character sequence, file-name information, and a document process to be performed to the received document, the character sequence and the file-name information being input and the document process being selected from a plurality of candidates by a user;
    a specifying unit configured to, if one of a plurality of character sequences registered by the registering unit as part of the data groups is included in the information associated with the received document, specify the file-name information and the document process which are grouped with the included character sequence; and
    a processing unit configured to, without a user's operation, set a file name based on the specified file-name information to the received document and to perform the specified document process to the received document, and if none of the plurality of character sequences is included in the information associated with the received document, to perform a predetermined process to the received document.

13. The data communication apparatus according to claim 12, wherein the processing unit transfers the received document to which the file name is set, to another data communication apparatus connected to the data communication apparatus via a network.

14. The data communication apparatus according to claim 12, wherein the registering unit further registers a character sequence so as not to be related to file-name information, and
    wherein if the character sequence which is not related to file-name information is included in the information associated with the received document, the processing unit sets a file name generated by a predetermined rule, to the received document.

15. The data communication apparatus according to claim 12, wherein the processing unit prints an image based on the received document, if none of the plurality of registered character sequences is included in the information associated with the received document.

16. The data communication apparatus according to claim 12, wherein the registering unit registers a condition name for each of the groups.

17. The data communication apparatus according to claim 12, wherein the specifying unit specifies the file-name information and the document process if one of the plurality of registered character sequences is included in a character sequence acquired by analyzing a content of the received document.

18. The data communication apparatus according to claim 12, wherein the receiving unit receives a facsimile document by a facsimile communication.

19. The data communication apparatus according to claim 18, wherein the receiving unit receives a sender's telephone number, an F code, or a password with the facsimile document, by using the facsimile communication, as the information associated with the document, and
wherein the specifying unit, if one of the plurality of registered character sequences is included in the telephone number, the F code, or the password received by the receiving unit, specifies the file-name information and the document process which are grouped with the included character sequence.

20. The data communication apparatus according to claim 12, wherein the receiving unit is capable of receiving the document according to a plurality of receiving protocols, and
wherein the registering unit registers the plurality of data groups so as to be associated with any of the plurality of receiving protocols corresponding to the receiving unit.

21. The data communication apparatus according to claim 20, wherein the specifying unit specifies the file-name information and the document process if one of the character sequences registered to be associated with the receiving protocol used when the receiving unit has received the document and the information association with the document, among the plurality of character sequences, is included in the information associated with the received document.

22. The data communication apparatus according to claim 12, wherein the specifying unit specifies the file-name information and the document process, without a user's operation.

23. A data processing method for a data communication apparatus, comprising:
performing by a process of the data communication apparatus at least one of the steps of:
receiving a document;
registering a plurality of data groups, each data group comprising a set of a character sequence, file-name information, and a document process to be performed to the received document, the character sequence and the file-name information being input and the document process being selected from a plurality of candidates by a user;
specifying, if one of the plurality of character sequences registered in the registering step as part of the data groups is included in the received document, the file-name information and the document process which are grouped with the included character sequence;
setting, without a user's operation, a file name based on the specified file-name information to the received document;
performing, without a user's operation, the specified document process to the received document; and
performing a predetermined process to the received document if none of the plurality of character sequences is included in the received document.

24. A data processing method for a data communication apparatus, comprising:
performing by a process of the data communication apparatus at least one of the steps of:
receiving a document and information associated with the document;
registering a plurality of data pairs groups, each data group comprising a set of a character sequence, file-name information, and a document process to be performed to the received document, the character sequence and the file-name information being input and the document process being selected from a plurality of candidates by a user;
specifying, if one of the plurality of character sequences registered in the registering step as part of the data groups is included in the information associated with the received document, the file-name information and the document process which are grouped with the included character sequence;
setting, without a user's operation, a file name based on the specified file-name information to the received document;
performing, without a user's operation, the specified document process to the received document; and
performing a predetermined process to the received document if it is determined that none of the plurality of character sequences is included in the information associated with the received document.

25. A non-transitory computer-readable storage medium storing a computer-readable program, said program comprising computer executable codes to perform a data processing method by a data communication apparatus, the data processing method comprising:
receiving a document;
registering a plurality of data groups, each data group comprising a set of a character sequence, file-name information, and a document process to be performed to the received document, the character sequence and the file-name information being input and the document process being selected from a plurality of candidates by a user;
specifying, if one of the plurality of character sequences registered in the registering step as part of the data groups is included in the received document, the file-name information and the document process which are grouped with the included character sequence;
setting, without a user's operation, a file name based on the specified file-name information to the received document;
performing, without a user's operation, the specified document process to the received document; and
performing a predetermined process to the received document if none of the plurality of character sequences is not included in the received document.

26. A non-transitory computer-readable storage medium storing a computer-readable program, said program comprising computer executable codes to perform a data processing method by a data communication apparatus, the data processing method comprising:
receiving a document and information associated with the document;
registering a plurality of data groups, each data group comprising a set of a character sequence, file-name information, and a document process to be performed to the received document, the character sequence and the file-name information being input and the document process being selected from a plurality of candidates by a user;
specifying, if one of a plurality of character sequences registered in the registering step as part of the data groups is included the information associated with the received document, the file-name information and the document process which are grouped with the included character sequence;
setting, without a user's operation, a file name based on the specified file-name information to the received document;
performing, without a user's operation, the specified document process to the received document; and
performing a predetermined process to the received document if none of the plurality of character sequences is included in the information associated with the received document.

* * * * *